July 12, 1955  E. L. BARRETT  2,713,080
BATTERY AND FILLING ARRANGEMENT THEREFOR
Filed Sept. 6, 1952  4 Sheets-Sheet 1
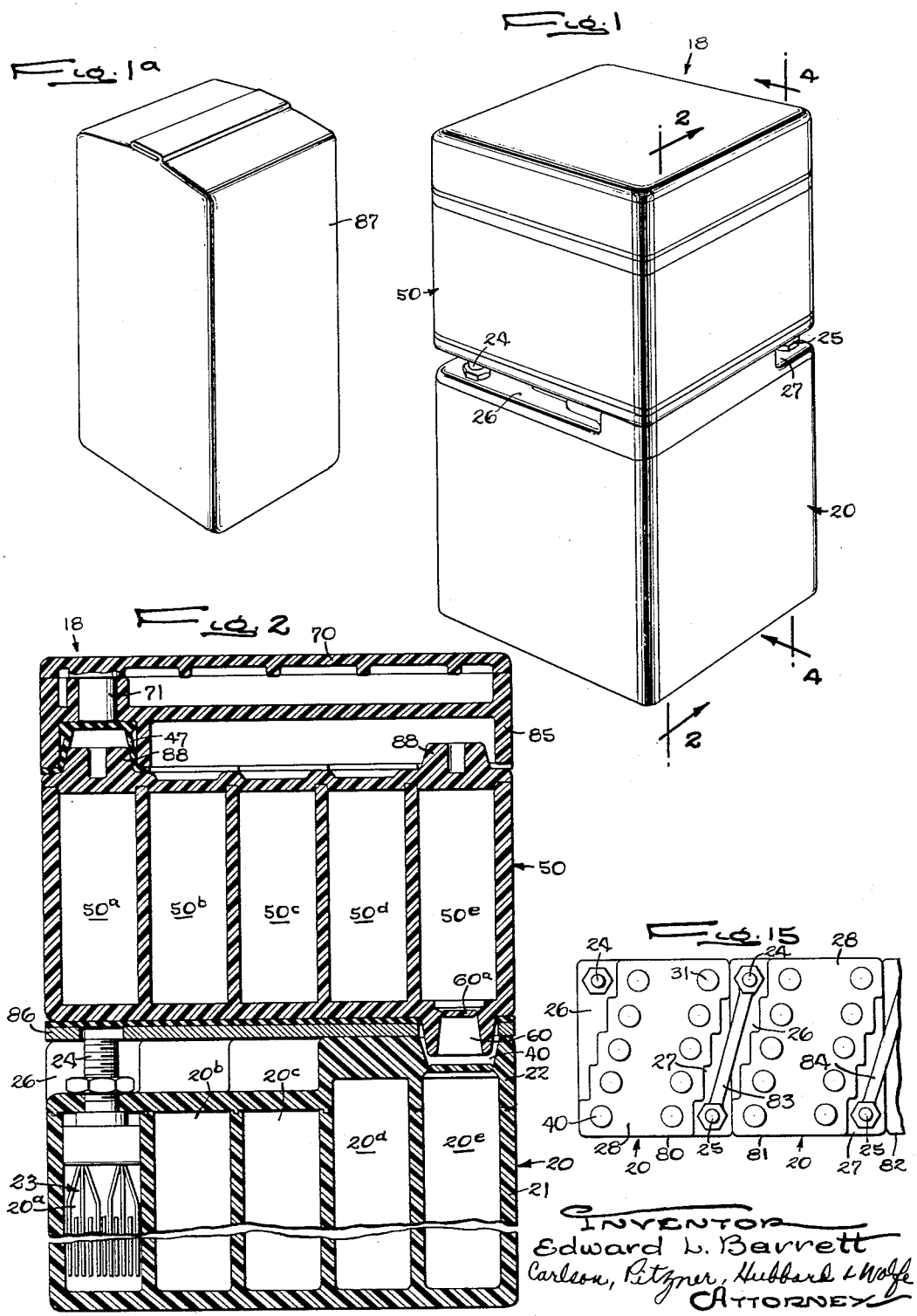
INVENTOR
Edward L. Barrett
Carlson, Pitzner, Hubbard & Wolfe
ATTORNEYS

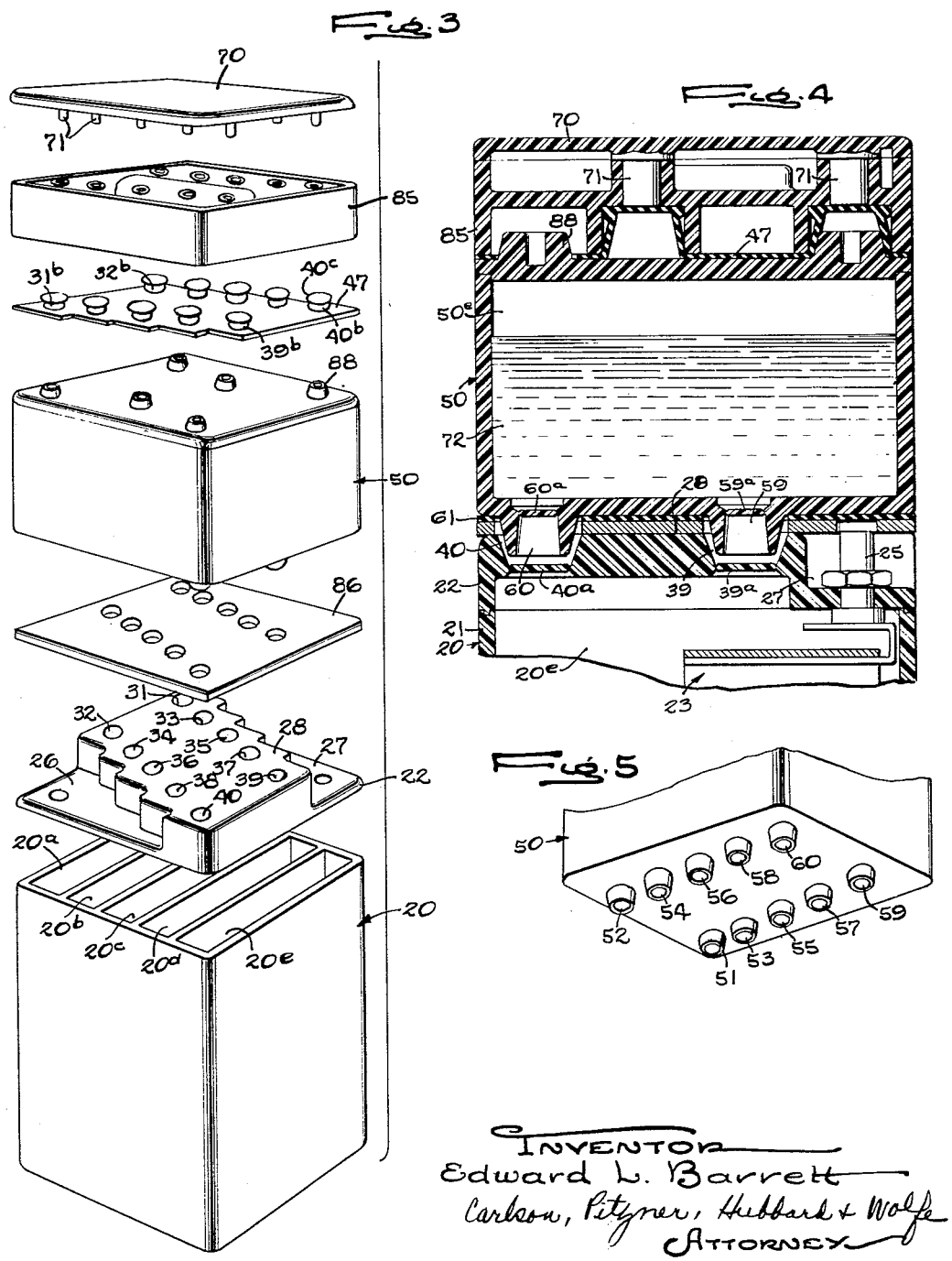

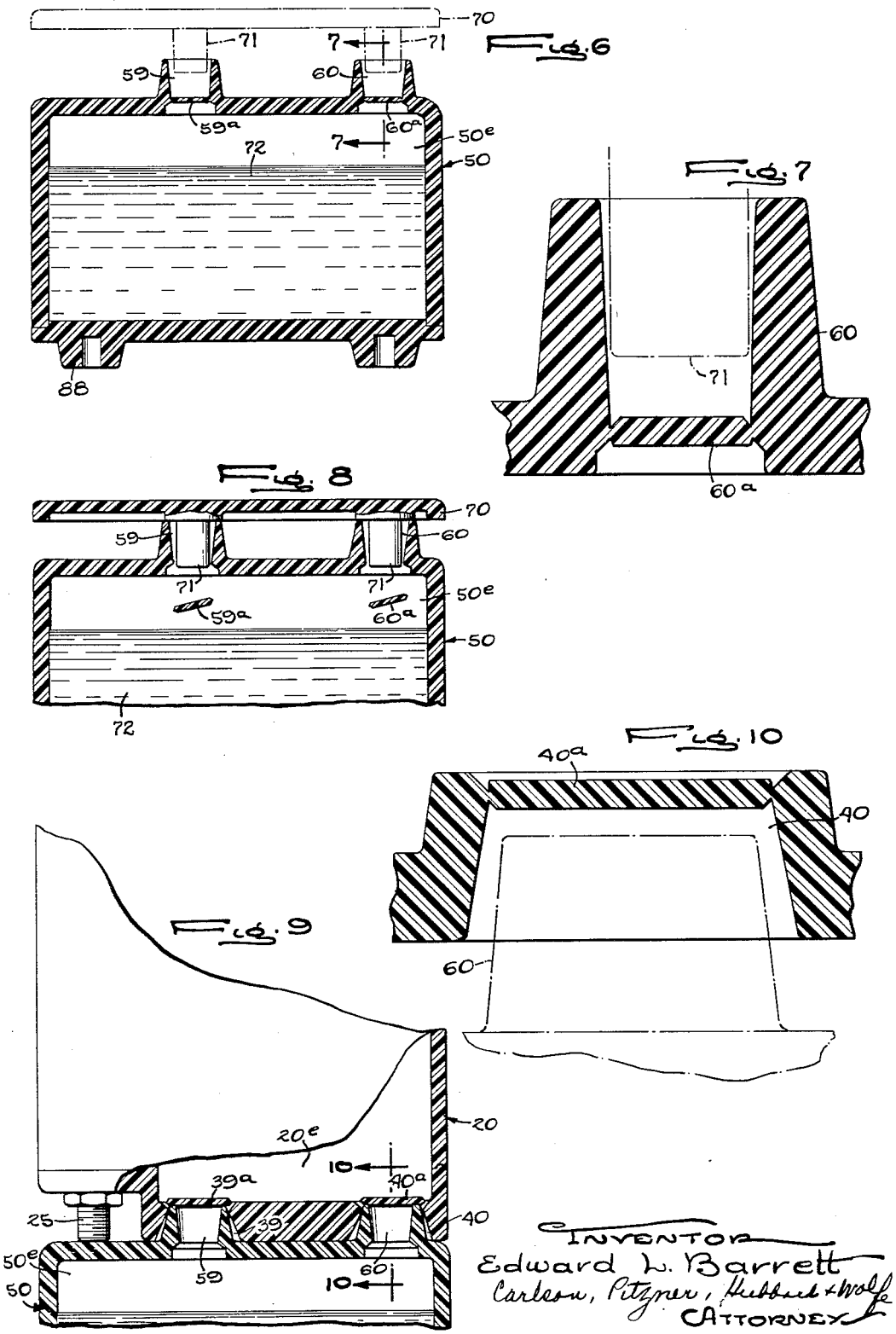

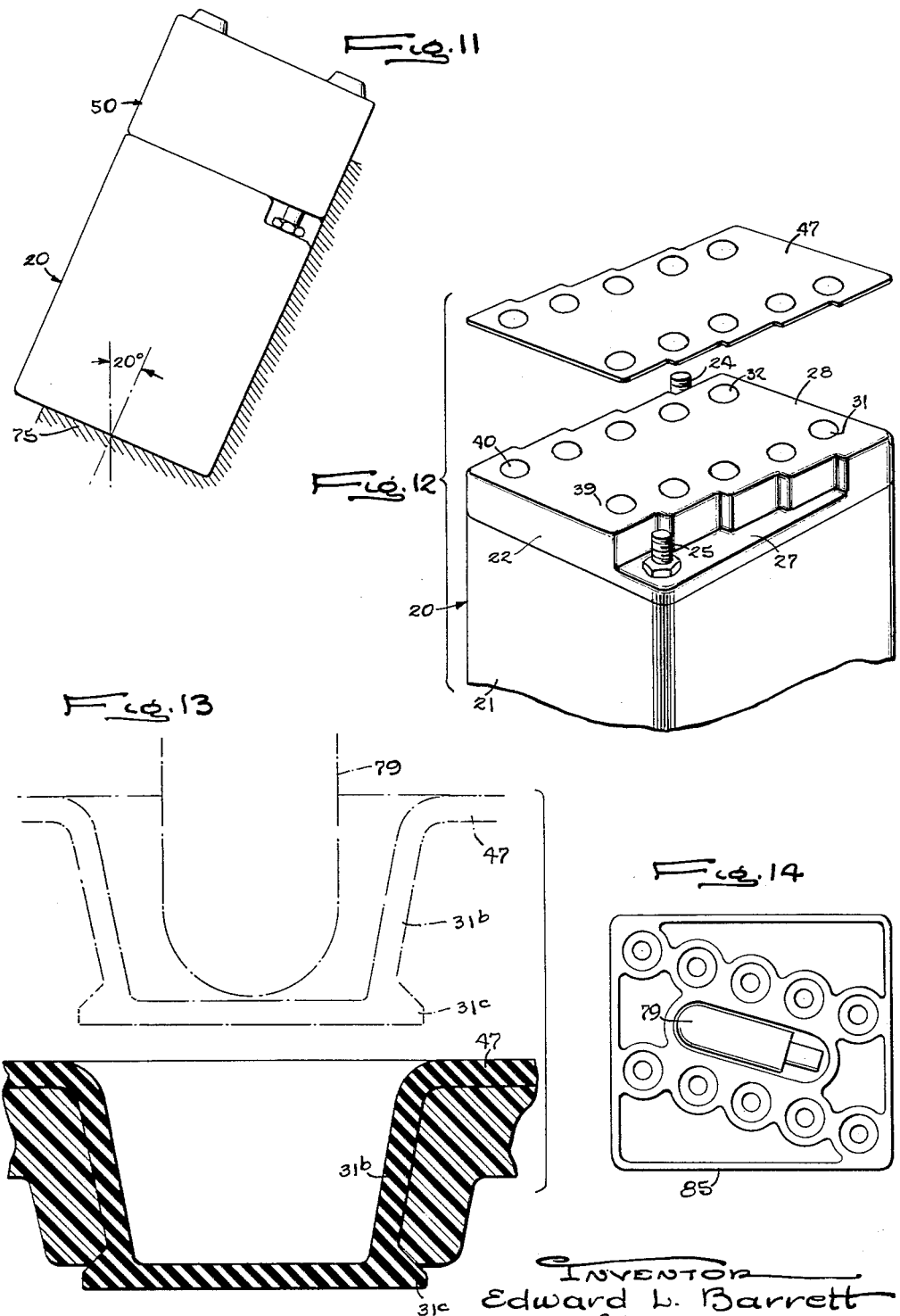

United States Patent Office 2,713,080
Patented July 12, 1955

2,713,080

BATTERY AND FILLING ARRANGEMENT THEREFOR

Edward L. Barrett, La Grange, Ill.

Application September 6, 1952, Serial No. 308,187

11 Claims. (Cl. 136—162)

The present invention relates to batteries and more particularly to batteries of the silver-zinc-alkali type having a high rate of discharge.

Batteries of the silver-zinc-alkali type are capable of producing an energy output per unit volume which is greatly in excess of that which is obtainable with more conventional types of batteries. As a result, such batteries have been proposed for use in guided missiles and the like where high output, over 100 amperes, at a useful voltage is required for a period of several minutes. However, one of the inherent limitations of batteries of this type is their short "wet stand" life, the battery discharging itself within a matter of hours after the addition of electrolyte and with no connected load. While such self-discharge is not complete, it is nevertheless sufficiently great so as to reduce the reliability of the battery in service. As a result, procedures have been worked out for adding electrolyte at the last possible time, for example, at the launching platform. One such procedure involves the use of a rubber diaphragm at the top of each cell which is punctured by hypodermic syringes for simultaneous addition of electrolyte and removal of air. This is a delicate operation which must frequently be carried out under adverse conditions. There is no real assurance of the predetermined quantity of electrolyte which has been added to each of the cells, since practically all of the electrolyte is absorbed by the plate structure and there may be little or no fluid in evidence. And, since the resiliency of the rubber diaphragm is depended upon to effect resealing when the syringes are withdrawn, there is always present the danger that leakage will occur when the battery is inverted in use. Because of the serious nature of these difficulties, considerable effort has been expended in an attempt to lengthen the wet stand life of this type of battery, but without significant success.

In my copending application, Serial No. 290,953, filed May 31, 1952, the above disadvantages are overcome providing a battery having a set of integral electrolyte storage chambers together with means for remote "arming" of the battery. While such an arrangement is completely satisfactory for many uses, the overall size is increased which is disadvantageous where compactness is of prime importance.

Accordingly, it is a general object of the present invention to provide a battery filling arrangement which overcomes the limitations associated with short wet stand life.

It is an object to provide a battery filling arrangement which enables batteries to be filled with electrolyte just prior to use with extreme reliability and under adverse conditions encountered in the filed.

It is another object to provide a battery filling arrangement which avoids the use of rubber diaphragms and syringes and which enables batteries to be filled with electrolyte by following a simple procedure which may be carried out even by an unskilled operator.

It is a further object to provide a filling arrangement which permits the battery to be extremely compact.

It is still another object to provide a battery filling arrangement which keeps the electrolyte fresh and pure until it is added to the battery. It is a related object to provide a battery filling arrangement which maintains the battery dry and hermetically sealed until the electrolyte is added.

It is a further object to provide a filling arrangement which insures that electrolyte is added to each cell in precisely controlled amount. It is a more detailed object to provide a filling arrangement in which the electrolyte for each cell is measured individually as part of the manufacturing procedure.

It is a still further object to provide a filling arrangement which prevents leakage during storage, filling and use and in which the battery and source of electrolyte are sealed together during the filling operation.

It is also an object to provide a battery in which a novel seal is provided to prevent leakage during use in spite of adverse operating conditions including shock, vibration, and the presence of large acceleration forces.

In one aspect of the invention it is the object to provide a battery assembly including a battery casing and electrolyte container which is compact, durable and capable of being stored for indefinitely long periods.

Finally, it is an object to provide a battery assembly which is simple and inexpensive and which requires no auxiliary filling equipment.

Other objects and advantages of the invention will be apparent upon reading the attached specification and upon inspection of the drawings, in which:

Figure 1 is a view in perspective of a battery assembly constructed in accordance with the present invention.

Fig. 1a shows the assembly bagged for storage.

Fig. 2 is a transverse section taken along the line 2—2 of Fig. 1.

Fig. 3 is an exploded view of the assembly of Fig. 1.

Fig. 4 is a fragmentary section taken along the line 4—4 in Fig. 1.

Fig. 5 shows the bottom view of the electrolyte cartridge in perspective.

Fig. 6 is a cross-section of an electrolyte chamber.

Fig. 7 is a fragment of an electrolyte nozzle taken along the line 7—7 in Fig. 6.

Fig. 8 shows the electrolyte cartridge engaged by a punch plate.

Fig. 9 is a fragmentary view showing the inversion of the battery over the open electrolyte cartridge.

Fig. 10 is a fragmentary view taken along the line 10—10 in Fig. 9 and showing insertion of an electrolyte nozzle into the battery.

Fig. 11 is an end view showing the battery and cartridge in tilted position for transfer of the electrolyte.

Fig. 12 shows the battery seal ready for application.

Fig. 13 is a fragmentary view of the manner in which the seal is seated in position.

Fig. 14 shows the seal pin recessed in the shipping tray.

Fig. 15 is a plan view showing a group of batteries connected in series with one another.

While the invention is susceptible of various modifications and alternative constructions and uses, I have shown only certain preferred embodiments. It will be understood, however, that I do not intend to limit my invention thereto but intend to include various alternative consructions and uses, limited only by the spirit and scope of the appended claims.

Referring now to Figs. 1–3 of the drawings, a battery assembly constructed and arranged in accordance with the invention is indicated generally at 18 having a battery 20 and electrolyte cartridge 50. The battery 20 has a casing 21 provided with a top 22. It will be understood that the casing 21 is divided into a number of separate and isolated cells which, in the present example, are designated 20a—20e, inclusive.

The internal construction of the battery does not per se form a part of the present invention and the plate assembly in one of the cells has been indicated only diagrammatically at 23 in Fig. 2. The cells are connected in series by suitable internal connectors and terminals 24 and 25 are provided at opposite corners in the form of threaded studs. The terminals 24 and 25 occupy wedge-shaped grooves or recesses 26, 27, respectively, which define a raised portion or table 28 which in the present invention extends diagonally across the top of the battery. The purpose of the latter will be made clear as the discussion proceeds.

Each of the battery cells has a pair of openings for admission of the electrolyte, the openings being designated 31–40, inclusive. Taking the cell 20e by way of example, it will be seen (Figs. 3 and 4) that the openings 39, 40 formed in the cover 22 are sealed during storage by knock-outs 39a, 40a, respectively. These knock-outs are integrally molded in the top 22 and are recessed below the top surface of the battery for purposes of register as will be discussed.

For sealing the battery after electrolyte is added, a seal 47 is used formed of molded rubberlike material and which is impervious to electrolyte.

Turning now to Figs. 2, 4 and 5, the electrolyte cartridge 50 there shown is divided into five cells 50a–50e of the same width as the cells of the battery. Each of the electrolyte cells has two discharge nozzles in its top surface, the nozzles being designated 51–60, respectively. The nozzles are so arranged as to register with the openings 31–40 in the battery when the cartridge 50 is placed face-to-face with the battery, the nozzle 51 engaging the opening 31, the nozzle 52, the opening 32, etc. The nozzles are sufficiently long so as to displace the knock-outs in the battery openings (Figs. 9 and 19).

In accordance with one aspect of the invention, the nozzles 51–60 are normally sealed by knock-outs which may be molded integrally with the top of the electrolyte cartridge. These knock-outs are designated 51a–60a, respectively. As in the case of the battery, the entire cartridge may be molded of polystyrene or like plastic material capable of rupturing cleanly at a point of weakness and which is inert with respect to the electrolyte.

In practicing the present invention, the nozzles 51–60 in the cartridge are simultaneously opened by means of a punch plate. This is carried out as shown in Figs. 6 and 8, the punch plate 70 having spaced pins 71 which register with the respective nozzles. As shown in the transverse section in Fig. 8, driving home the punch plate 70 causes the knock-outs (here indicated at 59a–60a) to drop harmlessly into the electrolyte 72.

Further in accordace with the invention, the battery 20 is inverted and placed on top of the cartridge 50 as shown in Figs. 9 and 10. It will be apparent to one skilled in the art that the symmetrically angled arrangement of openings 31–40 and nozzles 51–60 permits either of the two units to be reversed end-for-end without destroying the condition of register. An operator in assembling the two units need only observe or "feel" that the side walls and end walls are alined with one another and when this condition is met the nozzles are automatically alined with the openings in the battery. After the two units are alined, they are pressed together with sufficient force to displace the knock-outs 31a–40a (see Fig. 9). This allows the nozzles to fully enter the openings and brings the top surfaces of the two units together.

After the battery and electrolyte cartridge have been pressed together, they are then inverted, as shown in Fig. 11, and laterally tilted at a small angle, say 20 degrees, relative to the vertical in a suitable holder 75.

When the battery is so positioned, the electrolyte runs out of the "lower" set of nozzles, for example, the even numbered, and allows the displaced air to escape into the cartridge through the "upper" set or odd-numbered nozzles. This automatically takes care of disposing of the displaced air and there is no necessity for external vents. During the discharge of electrolyte, the battery may be tilted either one way or the other in view of the symmetrical nozzle arrangement. Since the nozzles extend within the cells of the battery, there is no danger of electrolyte seeping between the battery and cartridge.

The two units are maintained in the position shown in Fig. 11 until it is observed that all of the electrolyte has been discharged. This can be noted visually since the cartridge is made of transparent plastic. If desired, the electrolyte may be colored with an inert dye or made fluorescent in order to signal the operator when the filling operation has been completed. Normally this takes only a matter of seconds, and the process may be further speeded by using separators in the battery which has been previously treated with a wetting agent and which are as porous as possible. It will be noted that each of the battery cells receives a precisely measured amount of electrolyte and there is no possibility of underfilling or overfilling. Eliminating underfilling is particularly important since a cell to which only a few drops of electrolyte has been added will exhibit full voltage and may provide sufficient current for check-out purposes. A cell which has an insufficient amount of electrolyte will, however, fail to produce rated current in use which may result in the loss of the missile.

With regard to overfilling, each of the cells is supplied with electrolyte sufficient to accomplish the desired function while leaving a desired air space at the top of the cell. In this connection, it is of interest to note that the table portion 28 in the top of the battery is summetrically stepped so that it has the same width for each of the cells. Also the underside of the table is sectioned to provide recesses of corresponding width for each of the battery cells. Thus, the air pocket provided for each of the cells is the same and the cells are more nearly identical than in prior art batteries of the same general type. The actual amount of air space above each of the cells is a matter of design well within the capability of one skilled in the art.

After the battery has been filled with electrolyte, the cartridge 50 is removed. The permanent seal 47 is then pressed into place as shown generally in Fig. 12 and in detail in Fig. 13. Preferably, the cover 47 includes integral hollow plugs 31b–40b which register in the battery openings 31–40. Each of the plugs has at its tip an outwardly flaring flange for locking the plug in place. In Fig. 13 the plug 31b has a flange 31c. In the upper portion of the figure the plug is shown about to be inserted while in the lower portion it is in sealing position. Positive seating of the plug is assured by using a small push pin 79. This pin is stored in the battery assembly as shown in Fig. 14. With the battery openings sealed as described there is no possibility of leakage, and the battery may thereafter be operated in any position without risk.

Several advantages of the angled table portion 28 and the symmetrical wedge-shaped recesses 26, 27 have already been alluded to. A further advantage is brought out in Fig. 15 which shows a number of batteries 80, 81 and 82 connected in series by means of connecting straps 83, 84. It will be noted that the wedge-shaped grooves in adjacent batteries cooperate to form a more or less rectangular channel; thus, the straps 83, 84 are recessed below the top surface of the battery and are protected both physically and electrically.

Flow of the electrolyte during the filling operation is not affected by the presence of the knock-outs in the electrolyte cell. In tilting the battery as shown in Fig. 11, the knock-outs simply occupy an out-of-the-way position in the lower corners of the electrolyte cells. In order to preclude the possibility that a dislodged knock-out might partially or completely cover a nozzle opening, further precautions may be taken. For example, the knock-out in the electrolyte cartridge may be made of irregular or oval shape rather than circular. This has not been found to be necessary in practice, however.

While the battery construction and filling procedure have been described above, the invention also resides in the novel battery assembly set forth in Figs. 1 to 4, inclusive. This assembly includes not only the battery 20 and electrolyte cartridge 50 arranged in stacked relation, but also includes the punch plate 70, a shipping tray 85, the seal 47, and a spacer 86, all arranged as shown. These parts interfit for register with one another in such a way that a compact unitary structure is produced. The battery assembly may conveniently be placed intact in a close-fitting plastic bag 87 which may be made, for example, of polyethylene film. The external appearance of the assembly for storage is shown in Fig. 1a.

Referring to Figs. 2 and 3 in greater detail, it will be noted that the shipping tray 85 is of webbed construction and includes upstanding boxes for registering with the pins 71 on the punch plate 70. Along its lower surface the shipping plate 85 has recesses for registering with the plug portions 31b–40b on the seal 47. The cartridge 50 is shipped in invented position, and is provided with upwardly facing bosses 88 which are nestingly received in the seal 47. The latter is shown a the left-hand portion of Fig. 2.

It is one of the more detailed features of the invention that the electrolyte cartridge 50 is stored in inverted position with its nozzles 51–60 received in the openings 31, 40 of the battery. The nozzles are, however, prevented from displacing the knock-outs 31a–40a by reason of the shipping spacer 86. This spacer is provided with a set of registering holes, allowing the nozzles to project downwardly for registering purposes, but at the same itme absolutely preventing displacement of the knock-outs even during extreme shock or vibration. The air-tightness of the electrolyte cartridge 50 and the battery 20 during storage is thus assured.

After the battery is filed following the procedure outlined above, the shipping tray and spacer may be discarded along with the electrolyte cartridge. However, since these are of low-cost molded parts, the battery assembly as a whole is inexpensive and eliminates more costly filling arrangements employing hypodermic needles and the like.

I claim as my invention:

1. A battery filling arrangement comprising a battery having two openings in each of the respective cells thereof, an electrolyte cartridge including a plurality of cells each containing a measured amount of electrolyte suitable for a single filling of the respective cells, said cartridge having a series of nozzles spaced to register with the battery openings so that electrolyte from said cartridge drains into the cells of the battery when the cartridge is inverted thereover with simultaneous escape of air into the cartridge, and means for sealing the battery and said cartridge face-to-face during the filling operation.

2. A battery filling arrangement comprising a battery having openings, said openings each having a displaceable sealing member for normally sealing the battery but which may be bodily displaced to uncover said opening by pushing it inwardly, an electrolyte cartridge having nozzles for registering with the battery openings, the nozzles thereon being of sufficient length so that they positively engage said sealing members to displace the same inwardly for admission of electrolyte from the nozzles when the latter are completely inserted in the battery openings.

3. A battery assembly comprising a battery having openings, said openings being normally sealed by knock-outs respectively, an electrolyte cartridge having nozzles for registering with the battery openings, the nozzles being of sufficient length so that they displace said knock-outs when said nozzles are completely and forcefully inserted in the battery openings, and a spacer interposed between said cartridge and said battery for keeping said nozzles normally out of contact with said knock-outs, means for sealing the battery openings after the cartridge is withdrawn.

4. A battery assembly comprising a battery having openings, said openings each having a displaceable sealing member which may be dislodged by pushing it inwardly, an electrolyte cartridge having nozzles for registering with the battery openings, respectively, the displaceable sealing members being recessed in said openings and said nozzles being of sufficient length so that they displace said displaceable sealing members when said nozzles are completely inserted in the battery openings, and a spacer having holes for registering with said nozzles, said spacer having such thickness that said nozzles project a substantial distance therethrough for maintaining said battery and said cartridge in register but with the nozzles out of contact with said displaceable sealing members.

5. A battery filling arrangement comprising a battery having openings, said openings being normally sealed by knock-outs respectively, an electrolyte cartridge having nozzles for registering with the battery openings, the nozzles being of sufficient length so that they displace said knock-outs when said nozzles are completely and forcefully inserted in the battery openings, and means for sealing the battery openings after the cartridge is withdrawn.

6. A battery filling arrangement comprising, in combination, a battery having openings in the top thereof, an electrolyte cartridge having nozzles in register with the battery openings so that the electrolyte in said cartridge drains into the battery cells when the cartridge is inverted thereover, each of said battery openings having a displaceable knock-out arranged substantially below the top surface of the battery so as to initially receive the nozzles of said cartridge and thereby to indicate that a condition of register is achieved, said nozzles being of sufficient length so as to press upon said knock-outs causing them to be displaced inwardly into the battery when the electrolyte cartridge is forcefully pressed into registered engagement with the battery.

7. A battery filling arrangement comprising a battery having a plurality of cells arranged side-by-side, an electrolyte cartridge having a plurality of electrolyte cells arranged side-by-side, each of said battery cells having openings at laterally opposite ends of the cell and each of the electrolyte cells having nozzles at its opposite ends for registering with said battery openings when the electrolyte cartridge is inverted over said battery, the spacing of the openings and registering nozzles enabling the battery to be laterally tilted during the filling operation for draining electrolyte out of the "lower" one of the openings while permitting displaced air to escape through the "upper" one of the openings.

8. A battery filling arrangement comprising a battery having cell openings arranged along its top surface, an electrolyte cartridge having a series of nozzles arranged along its top surface for registering with said openings when the electrolyte cartridge is inverted over the battery, said openings and said nozzles being normally sealed by integrally formed knock-outs in order to prevent contamination until the time that an electrolyte cartridge is emptied into said battery.

9. A battery filling arrangement comprising a battery having cell openings arranged along its top surface, an electrolyte cartridge having a series of nozzles arranged along its top surface for registering with said openings when the electrolyte cartridge is inverted over the battery, said openings and said nozzles being normally sealed by inwardly displaced knock-outs in order to prevent contamination until the time that an electrolyte cartridge is emptied into said battery, said cartridge having means for obstructing movement of the displaced knock-outs into a resealing position in said nozzles when the cartridge is in an inverted position.

10. A battery filling arrangement comprising a battery having a plurality of cells arranged flatly side by side, each of said cells having openings at laterally opposite ends of the cell, an electrolyte cartridge having a series of compartments corresponding to the cells of the battery, each of said compartments having nozzles located at the laterally opposite ends thereof and spaced to register with the battery openings so that when the assembled cartridge and battery are tilted electrolyte from said cartridge drains into the cells of the battery from the lower openings with air escaping through the upper openings, said battery and said cartridge each having a flat surface thereon surrounding the openings in each of them for face-to-face sealing contact when the battery and cartridge are mated together.

11. A battery filling arrangement comprising a battery having a casing providing a plurality of cells arranged flatly side by side, each of said cells being necked down at its upper end to provide individual compartments of equal volume and of reduced length relative to the cells, said casing being so formed that the compartments are progressively offset from one another to provide a table surface having a width which is less than the width of the battery and which extends angularly across the top of the battery to define wedge-shaped recesses along opposite sides of said table surface, openings in said table surface for permitting entry of electrolyte into each of the cells, respectively, and terminal means located in said recesses below the level of said table surface.

References Cited in the file of this patent

UNITED STATES PATENTS

| Number | Name | Date |
|---|---|---|
| 1,218,847 | Firey | Mar. 13, 1917 |
| 1,361,437 | Blau | Dec. 7, 1920 |
| 1,387,350 | Chamberlain | Aug. 9, 1921 |
| 1,448,142 | Martin | Mar. 13, 1923 |
| 1,506,172 | Fredette | Aug. 26, 1924 |
| 1,737,718 | Hausmann | Dec. 3, 1929 |
| 1,991,604 | Drabin | Feb. 19, 1935 |
| 2,516,084 | Wells | July 18, 1950 |
| 2,629,760 | Wells et al. | Feb. 24, 1953 |